UNITED STATES PATENT OFFICE 2,191,860

BIGUANIDINO SUBSTITUTED DIPHENYL-ENEOXIDES

Bruno Puetzer, Albany, N. Y., assignor to Winthrop Chemical Company, Inc., New York, N. Y., a corporation of New York No Drawing. Application June 9, 1937, Serial No. 147,354. In Germany June 9, 1933

3 Claims. (Cl. 260—346)

This invention relates to the manufacture of biguanidino substituted diphenyleneoxides which are therapeutically valuable media.

In accordance with the present invention biguanidino substituted diphenyleneoxides which exert considerable action on bacteria and protozoa are obtainable by the methods hereinafter described.

The nuclei of the new compounds may be further substituted by monovalent substituents, such as alkyl groups, for example, the methyl, ethyl, isopropyl and allyl group, and alkoxy groups of the same kind. Other substituents are, for instance, halogen atoms, preferably chlorine, bromine and iodine, the nitro group, alkylamino groups, and the like. It may be mentioned that also the biguanidino radical may contain substituents, for instance, aminoalkyl or alkylaminoalkyl radicals and one of the nitrogen atoms of the biguanidino radical may be the member of a heterocyclic nucleus. One or more biguanidino radicals may be present in the new compounds defined above.

In accordance with the present invention the new biguanidino substituted diphenyleneoxides are obtainable by reacting upon an amino substituted diphenyleneoxide with dicyandiamide in the presence of a solvent. The reaction proceeds, for instance, in accordance with the following equation:

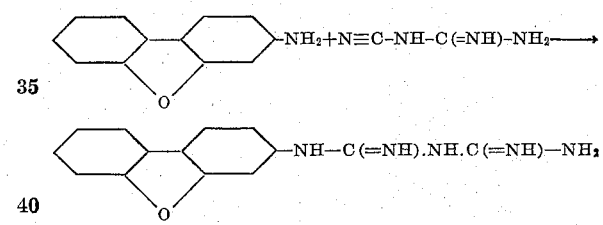

The reaction is preferably carried out with heating. Water or water-soluble alcohols are preferably used as solvents.

In further development of my present invention I have found that the new biguanidino substituted diphenyleneoxides are also obtainable by reacting upon amino diphenyleneoxides with N-guanyl substituted S-alkyl or S-arylalkyl-isothiourea ethers. The reaction, for instance, proceeds in accordance with the following equation:

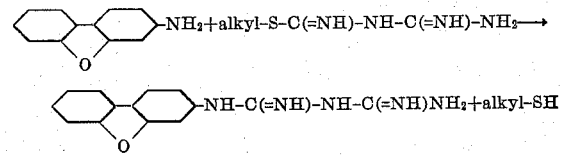

Alternatively the new products could be obtained by reacting upon a cyanamino compound of a diphenyleneoxide with guanidines, in which reaction guanidine is bound by the said cyanamino-diphenyleneoxide while forming the corresponding biguanidino-diphenyleneoxide.

Furthermore, thiourea or guanyl thiourea derivatives of diphenyleneoxides may be reacted with guanidines and with ammonia respectively in the presence of a condensing agent, such as metal compounds, for instance, lead hydroxide, in which case the corresponding biguanyl compound is formed while hydrogen sulfide is split off. For example, biguanidinodiphenyleneoxide is obtained by reacting upon a thiourea diphenyleneoxide with guanidine in accordance with the following equation:

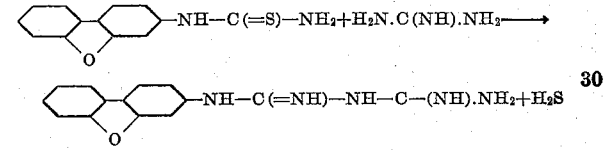

The valuable bactericidal properties of the new biguanidino substituted diphenyleneoxides obviously reside in the simultaneous presence of an ether-like linkage between two cyclic radicals, on the one hand, in the presence of at least one biguanidino group attached to a nucleus, on the other hand, since biguanidino compounds which do not contain the ether-like linkage between two cyclic radicals, do not show a considerable bactericidal action.

The invention is further illustrated by the following examples without being limited thereto:

*Example 1.*—18.3 grams of 2-aminodiphenyleneoxide, 100 ccs. of normal hydrochloric acid and 9 grams of dicyandiamide are heated to boiling for half an hour. After cooling the hydrochloride which has precipitated is filtered with suction, dissolved in hot water and the base precipitated by means of dilute caustic soda solution. The 2-biguanidinodiphenyleneoxide crystallizes from alcohol in whitish crystals melting at 186° C.

12.5 grams of 2.7-diaminodiphenyleneoxide-dihydrochloride, 40 ccs. of water and 18 grams of dicyandiamide are heated to boiling for one hour. After cooling the separated precipitate is dissolved in water, the new base is precipitated by means of aqueous caustic soda solution and recrystallized from dilute alcohol. The 2.7-bis-biguanidino-diphenyleneoxide forms whitish crystals melting at 216° C. which still contain 1 mol of crystal water.

In an analogous manner there are obtained 2-biguanidino-3-bromodiphenyleneoxide melting at 170° C., 2-biguanidino-6-iodo-diphenyleneoxide (hydrochloride melting at 234° C.), 2-α-methyl-biguanidino-diphenyleneoxide melting at 188° C., 2 - α -diethylaminoethylbiguanidino-diphenyleneoxide melting at 98° C., 3-biguanidinodiphenyleneoxide melting at 175° C., 2.6-bis-biguanidino-diphenyleneoxide melting at 209° C., 2.7-bis-(α-diethylaminoethylbiguanidino)-diphenyleneoxide melting at 132° C., 3.6-dimethyl-2.7-bis-biguanidino-diphenyleneoxide melting at 216° C.

*Example 2.*—2 - hydroxy-3-aminodiphenyleneoxide is boiled with 1 mol of dicyandiamide and 1 mol of dilute hydrochloric acid for one hour under reflux. On cooling the 2-hydroxy-3-biguanidino-diphenyleneoxide separates as hydrochloric acid salt. On recrystallization from water whitish crystals are obtained which are soluble in a large quantity of water.

This is a continuation in part application of my copending application Ser. No. 729,478, filed June 7, 1934, which has matured into U. S. Letters Patent No. 2,107,712.

I claim:

1. Biguanidino substituted diphenyleneoxides, which products are in the form of the free bases insoluble in water, but soluble in organic solvents and are soluble in water in the form of their salts.

2. 2 - biguanidine - diphenyleneoxide, which product forms crystals melting at 186° C. and is insoluble in water, but dissolves in water in the form of its salts.

3. 2.7-bis-biguanidino-diphenyleneoxide, which product forms crystals melting at 216° C. and is insoluble in water but dissolves in water in the form of its salts.

BRUNO PUETZER.